(12) United States Patent
Takeda

(10) Patent No.: US 9,260,600 B2
(45) Date of Patent: Feb. 16, 2016

(54) RUBBER COMPOSITION FOR USE IN TIRES

(75) Inventor: Shinya Takeda, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 5 days.

(21) Appl. No.: 14/131,829

(22) PCT Filed: Jul. 13, 2012

(86) PCT No.: PCT/JP2012/067982
§ 371 (c)(1),
(2), (4) Date: Jan. 9, 2014

(87) PCT Pub. No.: WO2013/008927
PCT Pub. Date: Jan. 17, 2013

(65) Prior Publication Data
US 2014/0155520 A1 Jun. 5, 2014

(30) Foreign Application Priority Data

Jul. 14, 2011 (JP) ................................. 2011-155385
Apr. 16, 2012 (JP) ................................. 2012-092844

(51) Int. Cl.
C08K 3/36 (2006.01)
B60C 1/00 (2006.01)
C08L 47/00 (2006.01)
C08L 15/00 (2006.01)
C08K 3/04 (2006.01)

(52) U.S. Cl.
CPC . C08L 47/00 (2013.01); B60C 1/00 (2013.01); B60C 1/0016 (2013.04); C08K 3/04 (2013.01); C08K 3/36 (2013.01); C08L 15/00 (2013.01)

(58) Field of Classification Search
CPC ........ B60C 1/0016; C08K 3/36; C08L 15/00; C08L 93/00
See application file for complete search history.

(56) References Cited

U.S. PATENT DOCUMENTS

| | | | |
|---|---|---|---|
| 6,506,829 B1 * | 1/2003 | Materne et al. | 524/493 |
| 8,507,582 B2 | 8/2013 | Takizawa | |
| 2011/0086943 A1 * | 4/2011 | Sato | B60C 1/0016 523/155 |
| 2011/0144236 A1 * | 6/2011 | Mihara | 523/158 |

FOREIGN PATENT DOCUMENTS

| | | |
|---|---|---|
| JP | 2008-101127 A | 5/2008 |
| JP | 2008-274120 A | 11/2008 |
| JP | 2009-091498 A | 4/2009 |
| JP | 2009-138157 A | 6/2009 |
| JP | 2009-263587 A | 11/2009 |
| JP | 2010126672 A * | 6/2010 |
| JP | 2011-001435 A | 1/2011 |
| JP | 2011-094012 A | 5/2011 |
| JP | 2011-132307 A | 7/2011 |

OTHER PUBLICATIONS

Machine translation of JP 2010-126672 A, Jun. 10, 2010.*
Machine translation of JP 2009-138157 A, Jun. 25, 2009.*

* cited by examiner

*Primary Examiner* — Vickey Nerangis
(74) *Attorney, Agent, or Firm* — Carrier Blackman & Associates, P.C.; Joseph P. Carrier; Anne G. Sabourin

(57) ABSTRACT

A rubber composition comprises from 2 to 50 parts by weight of an aromatic modified terpene resin having a softening point of ≥100° C., and two types of silica, a silica X and a silica Y, at a total quantity of 60 to 130 parts by weight relative to 100 parts by weight of a diene rubber containing from 5 to 50 weight % of a modified S-SBR having a vinyl content of not lower than 60 weight %. A functional group in the modified S-SBR reacts with a silanol group, a proportion of silica relative to the total quantity of a reinforcing filler containing the silica and carbon black is not lower than 85 weight %, a nitrogen specific surface area of the silica X is not lower than 140 m$^2$/g, and a nitrogen specific surface area of the silica Y is not lower than 100 m$^2$/g but lower than 140 m$^2$/g.

19 Claims, 1 Drawing Sheet

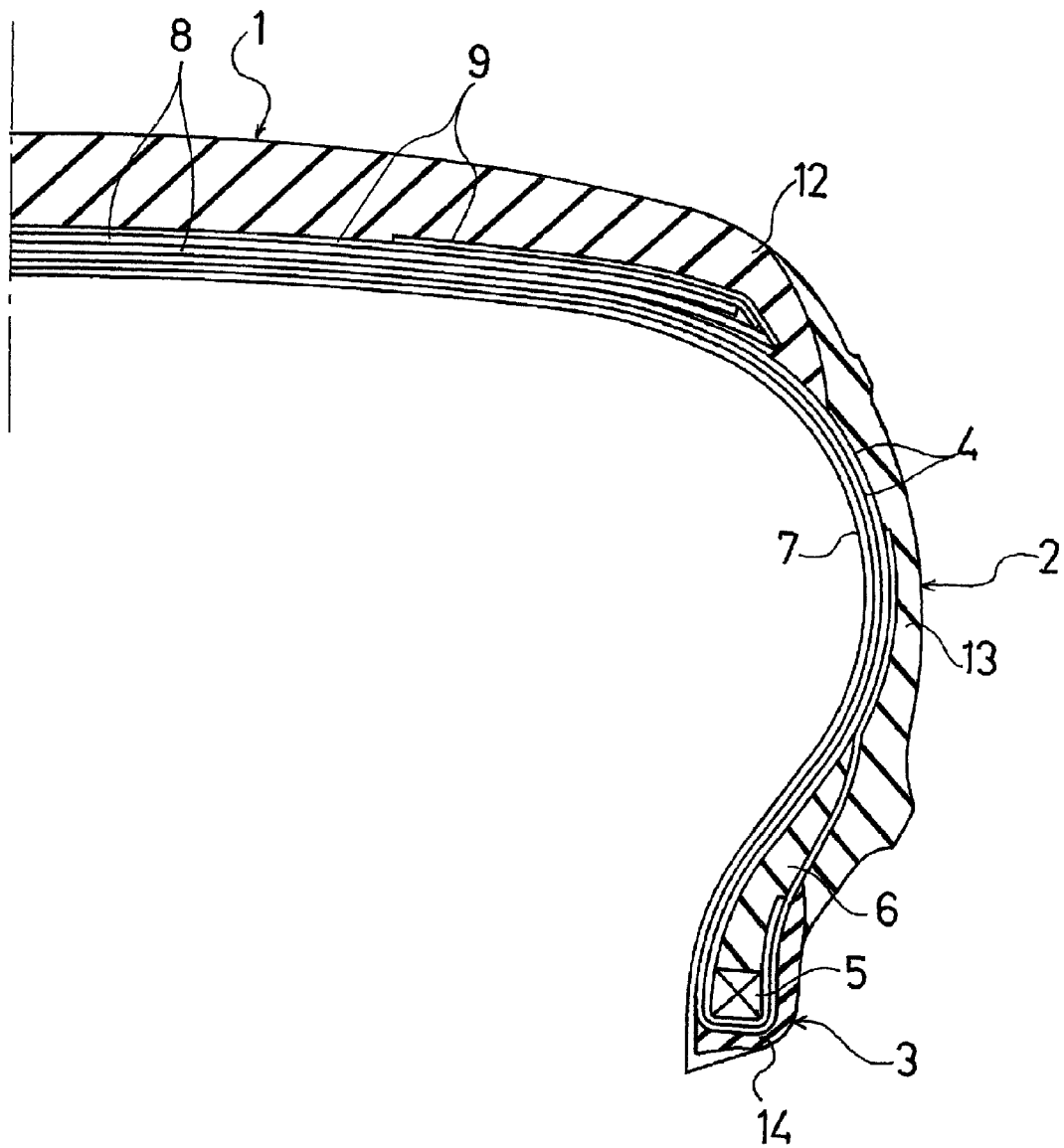

RUBBER COMPOSITION FOR USE IN TIRES

TECHNICAL FIELD

The present technology relates to a rubber composition for use in tires, by which low rolling resistance and wet grip performance can be enhanced beyond conventional levels.

BACKGROUND

In recent years, the JATMA labeling system has been introduced for pneumatic tires for passenger cars, and such tires require superior levels of both low rolling resistance and wet grip performance. In particular, the required level of wet grip performance is extremely high, and a pneumatic tire able to achieve grade a in terms of wet grip performance based on this labeling system has yet to be developed.

It is known that, conventionally, silica was blended in rubber compositions constituting tread portions of pneumatic tires in order to enhance the balance between low rolling resistance and wet grip performance. However, silica readily aggregates due to the presence of surface silanol groups, and because silica exhibits poor affinity for diene rubbers, silica dispersibility can be poor and, in such cases, the effect of modifying the dynamic visco-elasticity properties, such as the loss tangent (tan δ), of a rubber composition cannot be satisfactorily achieved.

As a result, Japanese Unexamined Patent Application Publication No. 2009-091498A proposes enhancing silica dispersibility and reducing rolling resistance (tan δ at 60° C.) by using a rubber composition obtained by blending silica in a solution polymerization-produced terminally modified styrene-butadiene rubber in which terminals are modified with a polyorganosiloxane or the like. It was found that this rubber composition exhibited the effect of reducing rolling resistance, but the levels demanded by consumers in terms of low rolling resistance and wet grip performance was higher and a significant enhancement in balance between low rolling resistance and wet grip performance was required.

SUMMARY

The present technology provides a rubber composition for use in tires, by which low rolling resistance and wet grip performance can be enhanced to or beyond conventional levels.

The rubber composition for use in tires of the present technology is characterized by comprising from 2 to 50 parts by weight of an aromatic modified terpene resin having a softening point of 100° C. or higher, and two types of silica, including a silica X and a silica Y, at a total quantity of 60 to 130 parts by weight relative to 100 parts by weight of a diene rubber containing from 5 to 50 weight % of a solution polymerization-produced terminally modified styrene-butadiene rubber (a modified S-SBR) having a vinyl unit content of not lower than 60 weight %, wherein a functional group in the modified S-SBR reacts with a silanol group on the silica surface, a proportion of silica relative to the total quantity of a reinforcing filler containing the silica and carbon black is not lower than 85 weight %, a nitrogen specific surface area of the silica X is not lower than 140 m$^2$/g, a nitrogen specific surface area of the silica Y is not lower than 100 m$^2$/g but lower than 140 m$^2$/g, and if the blending quantities of the silica X and the silica Y relative to 100 parts by weight of the diene rubber are deemed to be x parts by weight and y parts by weight respectively, the relationship $x/7 < y \leq x$ is satisfied.

The rubber composition for use in tires of the present technology contains from 2 to 50 parts by weight of an aromatic modified terpene resin having a softening point of not lower than 100° C. in a diene rubber containing from 5 to 50 weight % of a modified S-SBR having a vinyl unit content of not lower than 60 weight % and having functional groups able to react with silanol groups, limits the blending quantities of the two types of silica having the above-mentioned specific particulate form, that is, silica X and silica Y, and contains silica at a proportion of not lower than 85 weight % relative to the total weight of a reinforcing filler, and can thereby enhance silica dispersibility and enhance low rolling resistance and wet grip performance to or beyond conventional levels.

Hydroxyl groups and amino groups are preferred as the functional group in the modified S-SBR, exhibit excellent reactivity with silanol groups on the silica surface, and can enhance silica dispersibility.

A pneumatic tire that uses the rubber composition for use in tires of the present technology can enhance low rolling resistance and wet grip performance to or beyond conventional levels.

BRIEF DESCRIPTION OF THE DRAWING

FIG. 1 is a partial cross-sectional view in a tire meridian direction illustrating an example of an embodiment of a pneumatic tire in which a rubber composition for use in tires of the present technology is used.

BEST MODE FOR CARRYING OUT THE TECHNOLOGY

FIG. 1 illustrates an example of an embodiment of a pneumatic tire in which a rubber composition for use in tires is used in a tread portion. In FIG. 1, 1 is a tread portion, 2 is a side wall portion, and 3 is a bead portion.

In FIG. 1, two layers of a carcass layer 4, formed by arranging reinforcing cords extending in a tire radial direction in a tire circumferential direction at a predetermined pitch and embedding these reinforcing cords in a rubber layer, is disposed extending between left and right side bead portions 3. Both ends are made to sandwich a bead filler 6 around a bead core 5 that is embedded in the bead portions 3 and are folded back in a tire axial direction from the inside to the outside. An inner liner layer 7 is disposed inward of the carcass layer 4. Two layers of a belt layer 8, formed by arranging reinforcing cords extending inclined to the tire circumferential direction in the tire axial direction at a predetermined pitch and embedding these reinforcing cords in a rubber layer, is disposed on an outer circumferential side of the carcass layer 4 of the tread portion 1. The reinforcing cords of the two layers of a belt layer 8 cross interlaminarly so that the incline directions with respect to the tire circumferential direction are opposite each other. A belt cover layer 9 is disposed on an outer circumferential side of the belt layers 8. The tread portion 1 is formed from a tread rubber layer 12 on an outer circumferential side of the belt cover layer 9. The tread rubber layer 12 is formed from the rubber composition for use in tires of the present technology. A side rubber layer 13 is disposed outward of the carcass layer 4 in each side wall portion 2, and a rim cushion rubber layer 14 is provided outward of the portion of the carcass layer 4 that is folded back around each of the bead portions 3.

In the rubber composition for use in tires of the present technology, the rubber component comprises a diene rubber. Relative to 100 weight % of the diene rubber, from 5 to 50 weight % thereof is a solution polymerization-produced terminally modified styrene-butadiene rubber (hereinafter referred to as a "modified S-SBR"). This modified S-SBR has a vinyl unit content of not lower than 60 weight %, and preferably from 60 to 80 weight %. If the vinyl unit content in the modified S-SBR is lower than 60 weight %, affinity of the modified S-SBR with silica is insufficient and low rolling resistance and wet grip performance cannot be sufficiently enhanced. Note that the vinyl unit content in the modified S-SBR is measured using infrared emission spectroscopy (Hampton technique).

In the present technology, the modified S-SBR is a solution polymerization-produced styrene-butadiene rubber that is modified at one or both molecular terminals by a functional group able to react with a silanol group on the surface of the silica. The functional group able to react with a silanol group is preferably at least one type selected from a hydroxyl group-containing polyorganosiloxane structure, an alkoxysilyl group, a hydroxyl group, an aldehyde group, a carboxyl group, an amino group, an imino group, an epoxy group, an amide group, a thiol group, and an ether group. Of these, a hydroxyl group or amino group is more preferred.

The content of the modified S-SBR is from 5 to 50 weight %, and preferably from 10 to 30 weight %, relative to 100 weight % of the diene rubber. If the content of the modified S-SBR is lower than 5 weight %, silica dispersibility is insufficient and wet grip performance cannot be sufficiently enhanced. Meanwhile, if the content of the modified S-SBR exceeds 50 weight %, rolling resistance actually deteriorates.

In the rubber composition for use in tires of the present technology, the diene rubber contains from 50 to 95 weight %, and preferably from 70 to 90 weight %, of diene rubbers other than the modified S-SBR. Examples of other diene rubbers include natural rubbers, isoprene rubbers, butadiene rubbers, unmodified solution polymerization-produced or emulsion polymerization-produced styrene-butadiene rubbers, solution polymerization-produced terminally modified styrene-butadiene rubbers other than the above-mentioned modified S-SBR, butyl rubbers, brominated isobutylene/p-methylstyrene copolymer rubbers, ethylene-propylene-diene rubbers, and the like. Of these, natural rubbers, butadiene rubbers, emulsion polymerization-produced styrene-butadiene rubbers, unmodified solution polymerization-produced styrene-butadiene rubbers, solution polymerization-produced terminally modified styrene-butadiene rubbers other than the above-mentioned modified S-SBR and brominated isobutylene/p-methylstyrene copolymer rubbers are preferred. Moreover, solution polymerization-produced terminally modified styrene-butadiene rubbers other than the above-mentioned modified S-SBR means solution polymerization-produced terminally modified styrene-butadiene rubbers having a vinyl unit content of lower than 60 weight % and/or having functional groups that do not react with silanol groups.

In the present technology, blending an aromatic modified terpene resin can enhance the balance between low rolling resistance and wet grip performance and can significantly reduce rolling resistance in particular. The aromatic modified terpene resin has a softening point of not lower than 100° C., and preferably 100 to 130° C. If the softening point of the aromatic modified terpene resin is lower than 100° C., it is not possible to achieve the effect of enhancing wet grip performance. Moreover, the softening point of the aromatic modified terpene resin is measured in accordance with JIS (Japanese Industrial Standard) K 6220-1.

Examples of the aromatic modified terpene resin blended in the rubber composition for use in tires of the present technology include aromatic modified terpene resins obtained by copolymerizing a terpene compound such as α-pinene, β-pinene, dipentene, limonene and camphene with an aromatic vinyl compound such as styrene, α-methylstyrene, vinyl toluene, phenol and indene. The aromatic modified terpene resin can be a commercially available product such as YS Resin TO-125, TO-115, TO-105 and TR-105, all of which are manufactured by Yasuhara Chemical Co., Ltd.

The blending quantity of the aromatic modified terpene resin is from 2 to 50 parts by weight, and preferably from 5 to 50 parts by weight, relative to 100 parts by weight of the diene rubber. If the blending quantity of the aromatic modified terpene resin is lower than 2 parts by weight, it is not possible to sufficiently enhance the balance between low rolling resistance and wet grip performance. In addition, if the blending quantity of the aromatic modified terpene resin exceeds 50 parts by weight, the desired performance cannot be achieved due to, for example, the hardness being insufficient.

The rubber composition for use in tires of the present technology contains two types of silica, that is, a silica X, which has a nitrogen specific surface area of not lower than 140 $m^2/g$, and a silica Y, which has a nitrogen specific surface area of not lower than 100 $m^2/g$ but lower than 140 $m^2/g$. By blending the two types of silica consisting of the silica X and the silica Y, it is possible to suppress heat build-up in the rubber composition and reduce rolling resistance and improve wet grip performance when using the rubber composition in a tire.

The silica X used in the present technology has a nitrogen specific surface area of not lower than 140 $m^2/g$, preferably from 150 to 230 $m^2/g$, and more preferably not lower than 150 $m^2/g$ but lower than 185 $m^2/g$. By blending the silica X, it is possible to ensure a high level of wet grip performance. If the nitrogen specific surface area of the silica X is lower than 140 $m^2/g$, wet grip performance is insufficient.

In addition, the nitrogen specific surface area of the silica Y is not lower than 100 $m^2/g$ but lower than 140 $m^2/g$, preferably higher than 100 $m^2/g$ but not higher than 130 $m^2/g$, and more preferably from 105 to 130 $m^2/g$. By blending the silica Y, it is especially possible to reduce heat build-up and rolling resistance when the rubber composition is used in a tire. If the nitrogen specific surface area of the silica Y is lower than 100 $m^2/g$, it is not possible to enhance wet grip performance. In addition, if the nitrogen specific surface area of the silica Y is not lower than 140 $m^2/g$, it is not possible to sufficiently achieve the effect of reducing rolling resistance. Moreover, the nitrogen specific surface area of the silica X and that of the silica Y are determined in accordance with the BET method of ASTM D 3037-81.

In the present technology, if the blending quantities of the silica X and the silica Y relative to 100 parts by weight of the diene rubber are deemed to be x parts by weight and y parts by weight respectively, the total quantity of the silica X and the silica Y (x+y) is from 60 to 130 parts by weight, and preferably from 80 to 130 parts by weight. If the total quantity of the silica X and the silica Y (x+y) is lower than 60 parts by weight, it is not possible to sufficiently enhance the balance between low rolling resistance and wet grip performance. If the total quantity of the silica X and the silica Y (x+y) exceeds 130 parts by weight, the viscosity of the rubber increases and processability deteriorates.

In addition, the blending quantity of the silica X (x) and the blending quantity of the silica Y (y) must satisfy the relationship $x/7 < y \leq x$. If the blending quantity of the silica Y (y parts by weight) is not higher than one seventh of the blending quantity of the silica X (x parts by weight), that is, not higher than x/7, it is not possible to enhance the balance between low rolling resistance and wet grip performance. In addition, if the blending quantity of the silica Y (y parts by weight) exceeds the blending quantity of the silica X (x parts by weight), wet grip performance deteriorates.

The rubber composition of the present technology can contain a reinforcing filler other than silica. Examples of other reinforcing fillers include carbon black, clay, talc, calcium carbonate, mica, aluminum hydroxide, and the like. Of these, by blending carbon black, it is possible to reinforce the rubber and ensure dry grip performance and abrasion resistance.

The proportion of silica is not lower than 85 weight %, and preferably from 90 to 100 weight %, relative to a total of 100 weight % of the reinforcing filler that contains silica and carbon black. If the proportion of silica is lower than 85 weight %, it is not possible to enhance the balance between low rolling resistance and wet grip performance. Here, the blending quantity of the reinforcing filler other than silica is decided on the basis that the proportion of silica is not lower than 85 weight % relative to a total of 100 weight % of the reinforcing filler, and the blending quantity of the silica relative to 100 parts by weight of the diene rubber, that is, the total quantity of the silica X and the silica Y (x+y) is from 60 to 130 parts by weight.

The silica X and silica Y used in the present technology should be silica having the above-mentioned characteristics, and can be selected as appropriate from among commercially available products. In addition, the silica X and silica Y may be produced using conventional methods so as to have the above-mentioned characteristics. Types of silicas that can be used include, for example, wet method silicas, dry method silicas, surface treated silicas, and the like.

In the rubber composition of the present technology, it is preferable for the silica X and silica Y to contain a silane coupling agent, and doing so improves the silica dispersibility and enables enhanced reinforcement of the styrene-butadiene rubber. The blending quantity of the silane coupling agent is preferably from 3 to 15 weight %, and more preferably from 5 to 12 weight %, of the blending quantity of the silica. If the blending quantity of the silane coupling agent is lower than 3 weight % of the blending quantity of the silica, it is not possible to sufficiently achieve the effect of enhancing the silica dispersibility. In addition, if the blending quantity of the silane coupling agent exceeds 15 weight %, the silane coupling agent undergoes condensation, and the desired effect cannot be achieved.

The silane coupling agent is not particularly limited, but is preferably a sulfur-containing silane coupling agent. Examples thereof include bis-(3-triethoxysilylpropyl)tetrasulfide, bis(3-triethoxysilylpropyl)disulfide, 3-trimethoxysilylpropyl benzothiazole tetrasulfide, γ-mercaptopropyltriethoxysilane, 3-octanoylthiopropyl triethoxysilane, and the like, and derivatives thereof. Derivatives include, for example, NXT-Z (manufactured by Momentive Performance Materials Inc.).

In addition to the above-mentioned fillers, the rubber composition for use in tires can also contain various types of additives that are commonly used in rubber compositions for use in tires, such as vulcanization and crosslinking agents, vulcanization accelerators, antiaging agents, plasticizers, and processing aids. These additives may be blended according to any common method to form the rubber composition for use in tires and may be used in vulcanization or crosslinking. Blending quantities of these additives may be any conventional quantity, as long as the objective of the present technology is not impaired. Such a rubber composition can be produced by mixing the above-mentioned components using a known rubber kneading machine such as a Banbury mixer, a kneader, a roll, and the like.

The rubber composition for use in tires of the present technology can be used in pneumatic tires, and in tire tread portions in particular. A pneumatic tire that uses this rubber composition exhibits low rolling resistance and excellent fuel consumption performance, and also exhibits excellent wet grip performance and exhibits performance corresponding to grade a in terms of wet grip performance based on the JATMA (Japan Automobile Tyre Manufacturers Association, Inc.) labeling system.

The present technology is further described below by examples. However, the scope of the present technology is not limited to these examples.

EXAMPLES 26 types of rubber compositions for use in tires were prepared according to the formulations shown in Tables 1 to 3 (Working Examples 1 to 11 and Comparative Examples 1 to 15). The common components shown in Table 4 (with the exception of the sulfur and the vulcanization accelerator) were compounded with the rubber compositions, and the mixtures were kneaded in a 1.8 L sealed mixer for 5 minutes. The mixtures were then extruded as master batches, to which the sulfur and the vulcanization accelerator were added. The master batches were then kneaded on an open roll. Moreover, in Tables 1 to 3, modified S-SBR 4 and the unmodified SBR each contain 37.5 parts by weight of an oil-extension oil, meaning that the blending quantity rows show the actual blending quantity and (in parentheses) the net blending quantity of SBR excluding the oil-extension oil. In addition, the blending quantity of the aroma oil was adjusted as appropriate so that the total oil quantity in the rubber composition and/or rubber hardness were at comparable levels. The proportion of silica relative to the total quantity of silica and carbon black is shown in the "Silica proportion" rows. Moreover, the compounding agent quantities shown in Table 4 are shown as parts by weight relative to 100 parts by weight of the diene rubbers shown in Tables 1 to 3 (net rubber quantity).

The 26 obtained rubber compositions for use in tires were measured in terms of tan $\delta(60°$ C.) according to the following method, and this value was used as an indicator of rolling resistance.

tan $\delta(60°$ C.)

Vulcanized rubber samples were produced by pressure vulcanizing the 26 obtained rubber compositions for use in tires for 25 minutes at 160° C. in a mold having a prescribed shape. The tan $\delta(60°$ C.) value of the obtained vulcanized rubber samples was measured using a viscoelasticity spectrometer (manufactured by Toyo Seiki Seisaku-sho, Ltd.) under the following conditions: 10% initial distortion, ±2% amplitude, 20 Hz frequency, and 60° C. temperature. The obtained results are shown on the "Rolling resistance" rows of Tables 1 to 3, with an inverse of the value of Comparative Example 1 being 100. Higher index values indicate smaller tan $\delta(60°$ C.) values and lower heat build-up, which in turn indicates a lower rolling resistance and superior fuel consumption performance when used in a pneumatic tire.

Next, sets of four pneumatic tires having tire sizes of 205/55 R16 were produced. In each of the sets of four tires, one of the 26 types of rubber compositions for use in tire treads described above was used in the tread portion. The wet grip performance of each of the obtained 26 types of pneumatic tires was evaluated according to the method described below.

Wet Grip Performance

The obtained pneumatic tires were fitted to wheels having rim sizes of 6.5×J, the wheels were fitted to a 2.0 liter class test vehicle, and the wet grip performance was measured in accordance with the EU TEST METHOD FOR TYRE WET GRIP GRADING (C1 TYPES)). The obtained results are shown on the "Wet performance" rows of Tables 1 to 3, with an index value of Comparative example 1 being 100. Higher wet performance index values indicate superior wet grip performance.

TABLE 1

|  |  | Comparative Example 1 | Comparative Example 2 | Working Example 1 |
|---|---|---|---|---|
| Modified S-SBR 1 | Parts by weight | 12 | | |
| Modified S-SBR 2 | Parts by weight | | 12 | 12 |
| Modified S-SBR 3 | Parts by weight | | | |
| Modified S-SBR 4 | Parts by weight | 89.4 (65) | 89.4 (65) | 89.4 (65) |
| Unmodified SBR | Parts by weight | 31.6 (23) | 31.6 (23) | 31.6 (23) |
| BR | Parts by weight | | | |
| Silica X1 | Parts by weight | 90.0 | 90.0 | 75.0 |
| Silica Y1 | Parts by weight | | | 15.0 |
| Carbon black | Parts by weight | 10.0 | 10.0 | 10.0 |
| Coupling agent | Parts by weight | 7.2 | 7.2 | 7.2 |
| Modified terpene resin 1 | Parts by weight | 15.0 | 15.0 | 15.0 |
| Oil | Parts by weight | 2.0 | 2.0 | 2.0 |
| Silica proportion | Weight % | 90.0 | 90.0 | 90.0 |
| Wet performance | Index value | 100 | 110 | 108 |
| Rolling resistance | Index value | 100 | 100 | 114 |

|  |  | Working Example 2 | Working Example 3 | Working Example 4 |
|---|---|---|---|---|
| Modified S-SBR 1 | Parts by weight | | | |
| Modified S-SBR 2 | Parts by weight | 30 | 48 | |
| Modified S-SBR 3 | Parts by weight | | | 12 |
| Modified S-SBR 4 | Parts by weight | 89.4 (65) | 71.5 (52) | 89.4 (65) |
| Unmodified SBR | Parts by weight | 6.9 (5) | | 31.6 (23) |
| BR | Parts by weight | | | |
| Silica X1 | Parts by weight | 75.0 | 75.0 | 75.0 |
| Silica Y1 | Parts by weight | 15.0 | 15.0 | 15.0 |
| Carbon black | Parts by weight | 10.0 | 10.0 | 10.0 |
| Coupling agent | Parts by weight | 7.2 | 7.2 | 7.2 |
| Modified terpene resin 1 | Parts by weight | 15.0 | 15.0 | 15.0 |
| Oil | Parts by weight | 8.7 | 15.5 | 2.0 |
| Silica proportion | Weight % | 90.0 | 90.0 | 90.0 |
| Wet performance | Index value | 110 | 111 | 110 |
| Rolling resistance | Index value | 105 | 102 | 125 |

|  |  | Working Example 5 | Comparative Example 3 | Comparative Example 4 |
|---|---|---|---|---|
| Modified S-SBR 1 | Parts by weight | | | |
| Modified S-SBR 2 | Parts by weight | 12 | 3 | 55 |
| Modified S-SBR 3 | Parts by weight | | | |
| Modified S-SBR 4 | Parts by weight | 89.4 (65) | 101.8 (74) | 61.9 (45) |
| Unmodified SBR | Parts by weight | | 31.6 (23) | |
| BR | Parts by weight | 23 | | |
| Silica X1 | Parts by weight | 75.0 | 75.0 | 75.0 |
| Silica Y1 | Parts by weight | 15.0 | 15.0 | 15.0 |
| Carbon black | Parts by weight | 10.0 | 10.0 | 10.0 |
| Coupling agent | Parts by weight | 7.2 | 7.2 | 7.2 |
| Modified terpene resin 1 | Parts by weight | 15.0 | 13.6 | 15.0 |
| Oil | Parts by weight | 10.6 | | 18.1 |
| Silica proportion | Weight % | 90.0 | 90.0 | 90.0 |
| Wet performance | Index value | 106 | 100 | 111 |
| Rolling resistance | Index value | 125 | 119 | 94 |

TABLE 2

|  |  | Working Example 6 | Comparative Example 5 | Comparative Example 6 |
|---|---|---|---|---|
| Modified S-SBR 2 | Parts by weight | 12 | 12 | |
| Modified S-SBR 4 | Parts by weight | 89.4 (65) | 89.4 (65) | 89.4 (65) |
| Unmodified SBR | Parts by weight | 31.6 (23) | 31.6 (23) | 31.6 (23) |
| NR | Parts by weight | | | 12 |
| Silica X1 | Parts by weight | 75.0 | 80.0 | 90.0 |
| Silica Y1 | Parts by weight | 15.0 | | |
| Carbon black | Parts by weight | 10.0 | 20.0 | 10.0 |
| Coupling agent | Parts by weight | 7.2 | 7.2 | 7.2 |
| Modified terpene resin 1 | Parts by weight | 3.0 | 15.0 | 15.0 |
| Oil | Parts by weight | 14.0 | 2.0 | 2.0 |
| Silica proportion | Weight % | 90.0 | 80.0 | 90.0 |
| Wet performance | Index value | 103 | 99 | 95 |
| Rolling resistance | Index value | 145 | 100 | 105 |

|  |  | Comparative Example 7 | Working Example 7 | Comparative Example 8 |
|---|---|---|---|---|
| Modified S-SBR 2 | Parts by weight | 12 | 12 | 12 |
| Modified S-SBR 4 | Parts by weight | 89.4 (65) | 89.4 (65) | 89.4 (65) |
| Unmodified SBR | Parts by weight | 31.6 (23) | 31.6 (23) | 31.6 (23) |
| NR | Parts by weight | | | |
| Silica X1 | Parts by weight | 80.0 | 45.0 | 30.0 |
| Silica Y1 | Parts by weight | 10.0 | 45.0 | 60.0 |
| Carbon black | Parts by weight | 10.0 | 10.0 | 10.0 |
| Coupling agent | Parts by weight | 7.2 | 7.2 | 7.2 |
| Modified terpene resin 1 | Parts by weight | 15.0 | 15.0 | 15.0 |
| Oil | Parts by weight | 2.0 | 2.0 | 2.0 |
| Silica proportion | Weight % | 90.0 | 90.0 | 90.0 |
| Wet performance | Index value | 108 | 103 | 98 |
| Rolling resistance | Index value | 100 | 120 | 125 |

|  |  | Comparative Example 9 | Comparative Example 10 | Comparative Example 11 |
|---|---|---|---|---|
| Modified S-SBR 2 | Parts by weight | 12 | 12 | 12 |
| Modified S-SBR 4 | Parts by weight | 89.4 (65) | 89.4 (65) | 89.4 (65) |
| Unmodified SBR | Parts by weight | 31.6 (23) | 31.6 (23) | 31.6 (23) |
| NR | Parts by weight | | | |
| Silica X1 | Parts by weight | | 46.0 | 100.0 |
| Silica Y1 | Parts by weight | 90.0 | 9.0 | 35.0 |
| Carbon black | Parts by weight | 10.0 | 45.0 | |
| Coupling agent | Parts by weight | 7.2 | 4.4 | 8.0 |
| Modified terpene resin 1 | Parts by weight | 15.0 | 15.0 | 15.0 |
| Oil | Parts by weight | 2.0 | 2.0 | 2.0 |
| Silica proportion | Weight % | 90.0 | 55.0 | 100.0 |
| Wet performance | Index value | 90 | 93 | 110 |
| Rolling resistance | Index value | 127 | 80 | 97 |

TABLE 3

|  |  | Working Example 8 | Working Example 9 | Working Example 10 |
|---|---|---|---|---|
| Modified S-SBR 2 | Parts by weight | 12 | 12 | 12 |
| Modified S-SBR 4 | Parts by weight | 89.4 (65) | 89.4 (65) | 89.4 (65) |
| Unmodified SBR | Parts by weight | 31.6 (23) | 31.6 (23) | 31.6 (23) |
| Silica X1 | Parts by weight | | | 75.0 |
| Silica X2 | Parts by weight | 75.0 | | |
| Silica X3 | Parts by weight | | 75.0 | |
| Silica Y1 | Parts by weight | 15.0 | 15.0 | |
| Silica Y2 | Parts by weight | | | 15.0 |
| Silica Z | Parts by weight | | | |
| Carbon black | Parts by weight | 10.0 | 10.0 | 10.0 |

TABLE 3-continued

| | | | | |
|---|---|---|---|---|
| Coupling agent | Parts by weight | 7.2 | 7.2 | 7.2 |
| Modified terpene resin 1 | Parts by weight | 3.0 | 3.0 | 3.0 |
| Modified terpene resin 2 | Parts by weight | | | |
| Oil | Parts by weight | 14.0 | 14.0 | 14.0 |
| Silica proportion | Weight % | 90.0 | 90.0 | 90.0 |
| Wet performance | Index value | 110 | 112 | 108 |
| Rolling resistance | Index value | 110 | 105 | 108 |

| | | Working Example 11 | Comparative Example 12 | Comparative Example 13 |
|---|---|---|---|---|
| Modified S-SBR 2 | Parts by weight | 12 | 12 | 12 |
| Modified S-SBR 4 | Parts by weight | 89.4 (65) | 89.4 (65) | 89.4 (65) |
| Unmodified SBR | Parts by weight | 31.6 (23) | 31.6 (23) | 31.6 (23) |
| Silica X1 | Parts by weight | | 75.0 | |
| Silica X2 | Parts by weight | | | |
| Silica X3 | Parts by weight | 75.0 | | |
| Silica Y1 | Parts by weight | | | |
| Silica Y2 | Parts by weight | 15.0 | | 45.0 |
| Silica Z | Parts by weight | | 15.0 | 45.0 |
| Carbon black | Parts by weight | 10.0 | 10.0 | 10.0 |
| Coupling agent | Parts by weight | 7.2 | 7.2 | 7.2 |
| Modified terpene resin 1 | Parts by weight | 3.0 | 3.0 | 3.0 |
| Modified terpene resin 2 | Parts by weight | | | |
| Oil | Parts by weight | 14.0 | 14.0 | 14.0 |
| Silica proportion | Weight % | 90.0 | 90.0 | 90.0 |
| Wet performance | Index value | 112 | 95 | 80 |
| Rolling resistance | Index value | 102 | 130 | 180 |

| | | Comparative Example 14 | Comparative Example 15 |
|---|---|---|---|
| Modified S-SBR 2 | Parts by weight | 12 | 12 |
| Modified S-SBR 4 | Parts by weight | 89.4 (65) | 89.4 (65) |
| Unmodified SBR | Parts by weight | 31.6 (23) | 31.6 (23) |
| Silica X1 | Parts by weight | 45.0 | 75.0 |
| Silica X2 | Parts by weight | | |
| Silica X3 | Parts by weight | 45.0 | |
| Silica Y1 | Parts by weight | | 15.0 |
| Silica Y2 | Parts by weight | | |
| Silica Z | Parts by weight | | |
| Carbon black | Parts by weight | 10.0 | 10.0 |
| Coupling agent | Parts by weight | 7.2 | 7.2 |
| Modified terpene resin 1 | Parts by weight | 3.0 | |
| Modified terpene resin 2 | Parts by weight | | 3.0 |
| Oil | Parts by weight | 14.0 | 14.0 |
| Silica proportion | Weight % | 90.0 | 90.0 |
| Wet performance | Index value | 113 | 95 |
| Rolling resistance | Index value | 95 | 118 |

The types of raw materials used in Tables 1 to 3 are shown below.

Modified S-SBR 1: Solution polymerization-produced styrene-butadiene rubber having terminal N-methylpyrrolidone groups, Nipol NS116 manufactured by Zeon Corporation, vinyl unit content: 70 weight %, not oil-extended Modified S-SBR 2: Solution polymerization-produced styrene-butadiene rubber having terminal hydroxyl groups, Nipol NS616 manufactured by Zeon Corporation, vinyl unit content: 70 weight %, not oil-extended Modified S-SBR 3: Solution polymerization-produced styrene-butadiene rubber having terminal amino groups, T5560 manufactured by JSR, vinyl unit content: 61 weight %, not oil-extended Modified S-SBR 4: Solution polymerization-produced styrene-butadiene rubber having terminal hydroxyl groups, Tufden E581 manufactured by Asahi Kasei Chemicals Corporation, vinyl unit content: 43 weight %, oil-extended rubber containing 37.5 parts by weight of oil relative to 100 parts by weight of rubber component Unmodified SBR: Tufden 1834 manufactured by Asahi Kasei Chemicals Corporation, vinyl unit content: 10 weight %, oil-extended rubber containing 37.5 parts by weight of oil relative to 100 parts by weight of rubber component NR: Natural rubber, SIR-20

BR: Butadiene rubber; Nipol BR1220 (manufactured by Zeon Corporation)

Silica X1: Zeosil 1165 MP (manufactured by Rhodia), nitrogen specific surface area: 160 $m^2/g$.

Silica X2: Zeosil 195GR (manufactured by Rhodia), nitrogen specific surface area: 180 $m^2/g$ Silica X3: Zeosil 200 MP (manufactured by Rhodia), nitrogen specific surface area: 220 $m^2/g$ Silica Y1: Zeosil 115GR (manufactured by Rhodia), nitrogen specific surface area: 110 $m^2/g$ Silica Y2: Ultrasil 5000GR (manufactured by Degussa), nitrogen specific surface area: 125 $m^2/g$ Silica Z: Ultrasil 360 (manufactured by Degussa), nitrogen specific surface area: 50 $m^2/g$ Carbon black: Sho Black N234 (manufactured by Cabot Japan K.K.)

Silane coupling agent: sulfur-containing silane coupling agent, Si69 (manufactured by Evonik Degussa)

Modified terpene resin 1: Aromatic modified terpene resin, YS Resin TO-125 (manufactured by Yasuhara Chemical Co., Ltd.), softening point: 125° C.

Modified terpene resin 2: Aromatic modified terpene resin, YS Resin TO-85 (manufactured by Yasuhara Chemical Co., Ltd.), softening point: 85° C.

Aroma oil: Extract 4S (manufactured by Showa Shell Seikyu K.K.)

TABLE 4

Common Formulation of the Rubber Compositions

| | | |
|---|---|---|
| Zinc oxide | Parts by weight | 3.0 |
| Stearic acid | Parts by weight | 2.0 |
| Antiaging agent | Parts by weight | 3.0 |
| Sulfur | Parts by weight | 2.2 |
| Vulcanization accelerator 1 | Parts by weight | 2.3 |
| Vulcanization accelerator 2 | Parts by weight | 1.0 |

The types of raw materials used in Table 4 are shown below.

Zinc oxide: Zinc Oxide #3 (manufactured by Seido Chemical Industry Co., Ltd.)

Stearic acid: Industrial stearic acid N (manufactured by Chiba Fatty Acid)

Antiaging agent: Ozonon 6C (manufactured by Seiko Chemical Co., Ltd.)

Sulfur: "Golden Flower" oil-treated sulfur powder (manufactured by Tsurumi Chemical Industry Co., Ltd.)

Vulcanization Accelerator 1: Noccelar CZ-G (manufactured by Ouchi Shinko Chemical Industrial Co., Ltd.)

Vulcanization accelerator 2: PERKACIT DPG (manufactured by Flexsys)

As is clear from Tables 1 to 3, it was confirmed that the rubber compositions for use in tires of Working Examples 1 to 11 maintained/enhanced low rolling resistance (tan δ at 60° C.) and wet grip performance.

The rubber composition of Comparative Example 2 did not contain the silica Y, and could not therefore enhance rolling resistance.

The rubber composition of Comparative Example 3 contained less than 5 weight % of the modified S-SBR2, and could not therefore enhance wet grip performance. The rubber composition of Comparative Example 4 contained more than 50 weight % of the modified S-SBR2, and therefore exhibited inferior rolling resistance.

As is clear from Table 2, the rubber composition of Comparative Example 5 did not contain the silica Y and had a silica proportion of lower than 85 weight %, and could not therefore enhance rolling resistance or wet grip performance. The rubber composition of Comparative Example 6 contained natural rubber instead of a modified S-SBR, and therefore exhibited inferior wet grip performance.

The rubber composition of Comparative Example 7 was such that the blending quantity y of the silica Y was not higher than one seventh of the blending quantity x of the silica X, and could not therefore enhance rolling resistance. The rubber composition of Comparative Example 8 was such that the blending quantity y of the silica Y exceeded the blending quantity x of the silica X, and therefore exhibited inferior wet grip performance.

The rubber composition of Comparative Example 9 did not contain the silica X, and therefore exhibited inferior wet grip performance. The rubber composition of Comparative Example 10 was such that the total quantity of the silica X and the silica Y (x+y) was lower than 60 parts by weight, and therefore could not enhance wet performance and also exhibited significantly inferior rolling resistance. The rubber composition of Comparative Example 11 was such that the total quantity of the silica X and the silica Y (x+y) exceeded 130 parts by weight, and therefore could enhance wet performance, but exhibited inferior rolling resistance.

As is clear from Table 3, the rubber composition of Comparative Example 12 contained the silica Z, which had a nitrogen specific surface area of lower than $100 \, m^2/g$, instead of the silica Y, and therefore exhibited inferior wet grip performance.

The rubber composition of Comparative Example 13 did not contain the silica X, but contained two types of silica having nitrogen specific surface areas of lower than $140 \, m^2/g$ (silica Y2 and silica Z), and therefore exhibited inferior wet grip performance.

The rubber composition of Comparative Example 14 did not contain the silica Y, but contained two types of silica having nitrogen specific surface areas of not lower than $140 \, m^2/g$ (silica X1 and silica X3), and therefore exhibited inferior rolling resistance.

The rubber composition of Comparative Example 15 was such that the aromatic modified terpene resin 2 had a softening point of lower than 100° C., and therefore exhibited inferior wet grip performance.

What is claimed is:

1. A rubber composition for use in tires comprising from 2 to 50 parts by weight of an aromatic modified terpene resin having a softening point of 100° C. or higher, and two types of silica, including a silica X and a silica Y, at a total quantity of 60 to 130 parts by weight relative to 100 parts by weight of a diene rubber containing from 5 to less than 30 weight % of a solution polymerization-produced terminally modified styrene-butadiene rubber (a modified S-SBR) having a vinyl unit content of not lower than 60 weight %, wherein a functional group in the modified S-SBR reacts with a silanol group on a surface of the silica, a proportion of silica relative to a total quantity of a reinforcing filler containing the silica and carbon black is not lower than 85 weight %, a nitrogen specific surface area of the silica X is not lower than $140 \, m^2/g$, a nitrogen specific surface area of the silica Y is not lower than $100 \, m^2/g$ but lower than $140 \, m^2/g$, and where blending quantities of the silica X and the silica Y relative to 100 parts by weight of the diene rubber are deemed to be x parts by weight and y parts by weight respectively, the relationship $x/7 < y \leq x$ is satisfied.

2. The rubber composition for use in tires according to claim 1, wherein the functional group in the modified S-SBR is a hydroxyl group.

3. The rubber composition for use in tires according to claim 1, wherein the functional group in the modified S-SBR is an amino group.

4. The rubber composition for use in tires according to claim 1, wherein the modified S-SBR has a vinyl unit content of from 60 to 80 weight %.

5. The rubber composition for use in tires according to claim 1, wherein the functional group is at least one type selected from a hydroxyl group-containing polyorganosiloxane structure, an alkoxysilyl group, a hydroxyl group, an aldehyde group, a carboxyl group, an amino group, an imino group, an epoxy group, an amide group, a thiol group, or an ether group.

6. The rubber composition for use in tires according to claim 5, wherein the functional group is the hydroxyl group or the amino group.

7. The rubber composition for use in tires according to claim 1, wherein the diene rubber contains from greater than 70 to 95 weight % of diene rubbers other than the modified S-SBR.

8. The rubber composition for use in tires according to claim 1, wherein the diene rubber contains from 70 to 90 weight % of diene rubbers other than the modified S-SBR.

9. The rubber composition for use in tires according to claim 8, wherein the diene rubbers other than the modified S-SBR include one or more diene rubbers selected from the group consisting of: natural rubbers, butadiene rubbers, emulsion polymerization-produced styrene-butadiene rubbers, unmodified solution polymerization-produced styrene-butadiene rubbers, solution polymerization-produced terminally modified styrene-butadiene rubbers other than the modified S-SBR, and brominated isobutylene/p-methylstyrene copolymer rubbers.

10. The rubber composition for use in tires according to claim 1, wherein the aromatic modified terpene resin has a softening point of from 100° C. to 130° C.

11. The rubber composition for use in tires according to claim 1, comprising from 5 to 50 parts by weight of the aromatic modified terpene resin relative to 100 parts by weight of the diene rubber.

12. The rubber composition for use in tires according to claim 1, wherein the nitrogen specific surface area of the silica X is from $150 \, m^2/g$ to $230 \, m^2/g$.

13. The rubber composition for use in tires according to claim 1, wherein the nitrogen specific surface area of the silica X is from $150 \, m^2/g$ to $185 \, m^2/g$.

14. The rubber composition for use in tires according to claim 1, wherein the nitrogen specific surface area of the silica Y is higher than $100 \, m^2/g$ and not higher than $130 \, m^2/g$.

15. The rubber composition for use in tires according to claim 1, wherein the nitrogen specific surface area of the silica Y is from $105 \, m^2/g$ to $130 \, m^2/g$.

16. The rubber composition for use in tires according to claim 1, comprising a total quantity of 80 to 130 parts by weight of the silica relative to 100 parts by weight of the diene rubber.

17. The rubber composition for use in tires according to claim 1, wherein the proportion of the silica relative to the total quantity of the reinforcing filler containing the silica and carbon black is from 90 to 100 weight %.

18. The rubber composition for use in tires according to claim 1, further comprising a sulfur-containing silane coupling agent in an amount of from 5.0 to 12 weight % of the silica.

19. A pneumatic tire that uses the rubber composition for use in tires according to claim 1.

* * * * *